Sept. 21, 1965  E. G. TATTERSALL  3,207,113
VEHICLES FOR OPERATING OVER WATER
Filed Aug. 7, 1962  6 Sheets-Sheet 1

INVENTOR
E. G. TATTERSALL
BY Cameron, Kerkam & Sutton
ATTORNEYS

Sept. 21, 1965  E. G. TATTERSALL  3,207,113
VEHICLES FOR OPERATING OVER WATER
Filed Aug. 7, 1962  6 Sheets-Sheet 3

INVENTOR
E. G. TATTERSALL
BY
Cameron, Kerkam + Sutton
ATTORNEYS

Sept. 21, 1965  E. G. TATTERSALL  3,207,113
VEHICLES FOR OPERATING OVER WATER
Filed Aug. 7, 1962  6 Sheets-Sheet 5

INVENTOR
E. G. TATTERSALL
BY
Cameron, Kerkam + Sutton
ATTORNEYS

Sept. 21, 1965     E. G. TATTERSALL     3,207,113
VEHICLES FOR OPERATING OVER WATER Filed Aug. 7, 1962     6 Sheets-Sheet 6

INVENTOR

E. G. TATTERSALL

BY

ATTORNEYS

United States Patent Office 3,207,113
Patented Sept. 21, 1965

3,207,113
VEHICLES FOR OPERATING OVER WATER
Edward Gunston Tattersall, Hythe, England, assignor to Hovercraft Development Limited, London, England, a British company
Filed Aug. 7, 1962, Ser. No. 215,440
Claims priority, application Great Britain, Aug. 17, 1961, 29,708/61
11 Claims. (Cl. 114—67)

This invention relates to vehicles for travelling over water and which are supported, at least in part, by a cushion or cushions of pressurised gas formed and contained beneath the vehicle, the cushion or cushions being at least partly contained around the lateral periphery by one or more curtains of fluid issuing from supply ports formed in the bottom of the vehicle.

In such vehicles it has been proposed to provide side walls depending from the bottom surface of the vehicle, at least one on each side of the vehicle, the gap between the ends of the side wall at the front and rear of the vehicle being closed by fluid curtains. The side walls may at all times have at least their bottom edges immersed in the water or supply ports may be formed in the bottom of the side walls from which issues fluid to form curtains, the curtains closing any gap existing between the bottoms of the side walls and the water surface.

In operation, it is necessary for the clearance between the ports of the vehicle from which issues the fluid forming the curtains at the front and rear of the vehicle and the water surface to be such that with water of the maximum wave height for which the vehicle is designed there will be substantially no contact at any time by the water with the main body of the vehicle. At times when the water is not of the maximum wave height, however, inefficient operation of the vehicle results. The present invention is concerned with modification and improvements of such vehicles to improve the efficient operation of the vehicles as hereinafter described.

Further, vehicles in which the side walls are at all times at least partly immersed are required to moor alongside a pier or jetty having a water depth alongside sufficient to avoid the bottoms of the side walls touching the ground surface when the cushion is not in being as the side walls are then more deeply immersed than when the cushion is in being. It is not possible to bring such vehicles on to a hard land surface unless they are first positioned on some suitable means of conveyance such as one or more trolleys.

According to the invention there is provided a vehicle for travelling over water and which in operation is at least partly supported above the surface of the water by at least one cushion of pressurised gas formed and contained beneath the vehicle and having at least one wall depending from the bottom surface of the vehicle said wall forming at least part of the lateral boundary of a cushion, means being provided for causing a fluid to issue from the bottom of the vehicle to form at least one fluid curtain which forms at least the lower part of the remaining lateral boundaries of the cushion and a movable structural member adapted to be brought into position to form at least the upper part of the said remaining lateral boundaries of the cushion while said fluid curtain forms the part of said boundaries remaining below said structural member.

By providing a movable structural member which can be used to contain the cushion for a part or the whole of its height, it is possible, as will be described below, to save power, when conditions permit, by reducing the depth to which the side walls are immersed. Further power saving can be obtained by also reducing the vertical energy in the air curtains and lowering the structural member still further. Again, as will be described below, the use of the invention enables vehicles having side walls which are normally at least partly immersed to be operated with an increased height relative to the surface so that the side walls are raised clear of the surface which enables such vehicles to be transferred from the water on to a land surface.

In the examples herein described, the cushions and curtains will be formed of air. However it is possible to form the cushions of other gases such as exhaust gases, or mixtures of air and exhaust gases for example. The curtains can be formed also of other gas such as exhaust gases or steam, or of a mixture of such gases with or without air.

Figure 1:
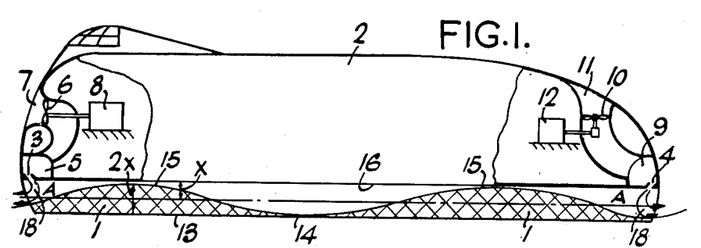
FIGURE 1 is a diagrammatic longitudinal vertical cross-section of a vehicle operating in one wave condition.
Figure 2:
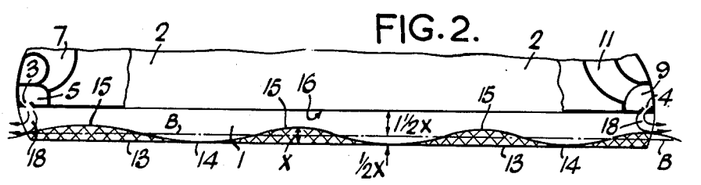
FIGURE 2 is a similar cross-section to that of FIGURE 1 with another wave form.
Figure 3:
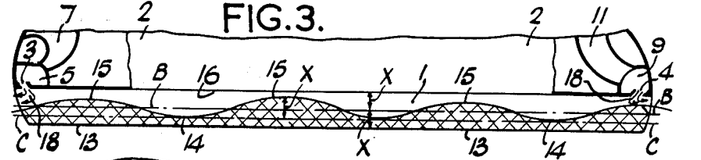
FIGURE 3 is a similar cross-section to that of FIGURE 2, with the same wave form as in FIGURE 2 but with a different operating condition.

The invention will be understood by the following description of certain operating modes of a vehicle and of some embodiments of the invention, by way of example, in conjunction with the accompanying drawings in which:

FIGURES 1 to 3 illustrate two operating modes of a vehicle and illustrate how the inefficiency in operating occurs. It should be appreciated that the propulsive power required can be divided into two parts, (i) That required to overcome the wave form profile and momentum drags of the gaseous cushion and (ii) That required to overcome skin friction and wave form drag of the side-walls.

Of these two parts, the individual components of that part of the propulsive power required for the cushion are so inter-related that a substantially regular power requirement occurs at all speeds. For the side walls, however, the power requirements increase rapidly with speed. It is with this latter part, the power requirements due to contact of the side walls with the water, that one aspect of the invention is concerned, although, in addition, as stated above and will be seen hereinafter, the invention also provides a means for reducing the cushion forming and containing power, and a means for transferring a vehicle from a water surface to a land surface and vice-versa.

Considering first FIGURE 1, this illustrates a vehicle having side walls 1, one on each side of the vehicle and extending the length thereof. Formed at the front and rear of the undersurface of the main body 2 of the vehicle and extending between the ends of the side walls 1 are supply ports 3 and 4. Air is fed to the supply ports 3 at the front of the vehicle via a duct 5 into which air is pumped by a propellor 6 situated in an intake 7, and driven by an engine 8. The supply port 4 at the rear is fed via a duct 9 into which air is pumped by a propellor 10 situated in an intake 11 and driven by an engine 12. Assuming that the side walls 1 are designed for a clearance or wave height of $2x$, and that no fluid curtains are formed from the bottom edges 13 of the side walls, the bottom edges of the side walls, for minimum propulsion power requirements, will be just below the surface of the water at the troughs 14. The crests 15 of the waves will just clear the under surface 16 of the main body 2 of the vehicle. The mean level of the water surface, assuming a substantially regular wave form, will be as indicated by the line A—A in FIGURE 1, this line bein $1x$ from the under surface 16 of the vehicle. This distance $1x$ is the mean height of the fluid curtains 18 formed from the supply ports 3 and 4 at the front and rear of the vehicle. The drag of the side walls is dependent on the area immersed at any one instant, i.e. the area cross hatched in FIGURE 1.

Turning now to FIGURE 2, this illustrates the vehicle shown in FIGURE 1 with waves of a reduced height, e.g., $x$. Making the assumption, as shown in FIGURE 2, that the bottom edges 13 of the side walls 1 are again just below the surface of the water at the troughs 14, it would appear that as the drag of the side walls is reduced, less area being immersed at any one instant, either power will be saved, or the vehicle could travel faster for the same power. However, it will be appreciated that, if the height of the waves is $x$, the mean level of the water surface, indicated by the line B—B, is $x/2$ from the bottom of the troughs, or $1\frac{1}{2}x$ from the under surface 16 of the vehicle. Thus the fluid curtains will have a mean height of $1\frac{1}{2}x$. Unless the strength of the fluid curtains is increased they will not be able to contain the cushion at this clearance, and in practice the vehicle will operate as illustrated in FIGURE 3.

As illustrated in FIGURE 3, the waves are of the same height as in FIGURE 2, i.e. $x$, and the mean level of the water surface, B—B, is a distance of $x$ from the under surface 16 of the vehicle, the curtains 18 thus having a mean height of $x$. The bottom edges 13 of the side walls 1 are now immersed a distance of $x/2$ below the surface of the water at the troughs 14 indicated by line C—C. The drag of the side walls is thus composed of that due to the area immersed at any one instant and represented by the cross hatched areas above the line C—C, and also that due to the constantly immersed area represented by the cross hatched area below the line C—C. Thus the decrease in immersion due to the decrease in wave height is offset by the constantly immersed lower part of the side walls. Over a smooth water surface, the vehicle will operate with half of the side walls constantly immersed.

The power requirements resulting from the constantly immersed portions of the side walls can be avoided by increasing the strength of the fluid curtains so that the bottom edges of the side walls are again just below the water surface at the troughs, or over smooth water, just below the water surface. The power requirements for forming the curtains will however increase in proportion to the additional height it is necessary for them to seal and the net saving in overall power is therefore likely to be very low.

By arranging for the fluid to issue from the vehicle from a position which is adjustable vertically relative to the bottom surface of the vehicle, it is possible to retain the reduced drag due to the reduced area of immersion of the side walls in smaller waves, without increasing the strength of the fluid curtains, and as will be seen later, it is even possible to reduce the strength of the curtains and save further power where the clearance required is less than the desired maximum.

Figure 4:
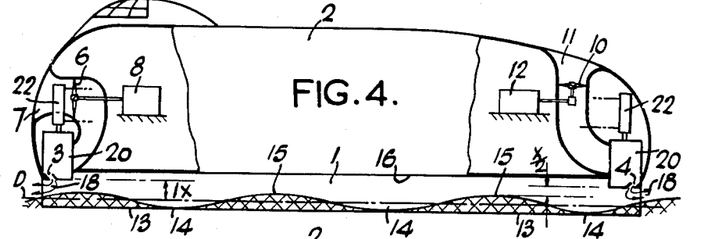
FIGURE 4 is a similar cross-section to that of FIGURE 1 illustrating one embodiment of the invention.

FIGURE 4 illustrates the vehicle according to the invention, which is of the same general form as the vehicles illustrated in FIGURES 1 to 3, in which the supply ports 3 and 4 are formed in the bottom of movable structural members 20. The members 20 form ducts through which the air is supplied to the supply ports 3 and 4 and are movable vertically within the vehicle, suitable means such as jacks 22 being provided for moving the members 20 up and down. For waves of $2x$ height the vehicle will operate in a manner similar to that shown in FIGURE 1, with the members 20 fully retracted, and the power requirements will be the same as for FIGURE 1.

For waves of $1x$ height, the vehicle will operate as shown in FIGURE 4. By moving down the members 20 to maintain the height of the supply ports at a distance of $1x$ from the mean water level D—D, the bottom edges 13 of the side walls 1 are just below the level of the water surface at the troughs 14. This is the same operating condition as that shown in FIGURE 2 and a reduced drag will occur due to the reduced immersion of the side walls. A power requirement equivalent to that necessary for the constantly immersed portions of the side walls in FIGURE 3 is saved. The vehicle can operate at the same speed, saving this power, or at an increased speed for the same power. The air curtains form the lower parts of the lateral boundary of the cushion which the members 20 form the upper parts.

In practice the vehicle will probably be designed for a specific speed with, for example, waves of height $x$ and operate at a reduced speed when full clearance is necessary. The time during which maximum clearance is required is likely to be only a very small percentage of the total operating time and it may be advisable to operate at a reduced speed when operating over waves of the maximum height. Due to the characteristics of the curve for power requirements with speed, the reduction in speed necessary for the increased clearance is likely to be relatively small.

Figure 5:
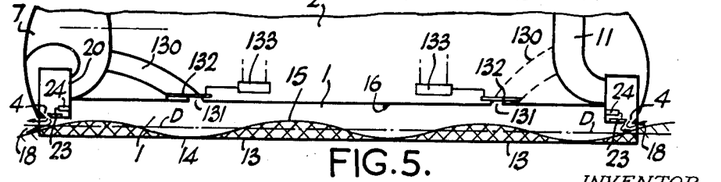
FIGURE 5 is a similar view to that of FIGURE 4 illustrating a further embodiment.

A further saving in power can be made in a vehicle operating as shown in FIGURE 4. It will be seen that in FIGURE 4, with the members 20 extended to maintain the curtain height at $x$ there is a clearance between the crests 15 of the waves and the supply ports 3 and 4 of $x/2$. If it is possible to reduce the mass flow, i.e., the strength of the curtains 18, the members 20 can be extended further. Thus, as shown in FIGURE 5, by providing sliding flaps 23 to reduce the width of the supply ports 3 and 4 to a suitable value, the member 20 can be extended so that the supply ports are just clear of the crests of the waves, the bottoms 13 of the side walls 1 still being just immersed at the troughs. The widths of the supply ports can be further reduced and the members 20 further extended as the waves get shallower. The flaps 23 can be operated, for example, by hydraulic jacks 24.

The invention is also applicable to vehicles in which fluid curtains are formed from the bottom edges of the side walls, either of the type in which, except over smooth water, part of the side walls is immersed the remaining gap being filled by the air curtains, or of the type in which, except for the occasional extra high wave, the side walls are always clear of the water surface.

Figure 6:
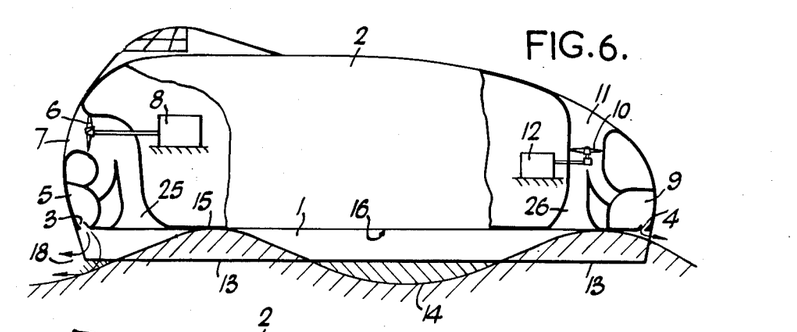
FIGURE 6 is a cross-section similar to that of FIGURE 1 illustrating an alternative form of vehicle operating in a further wave form.
Figure 7:
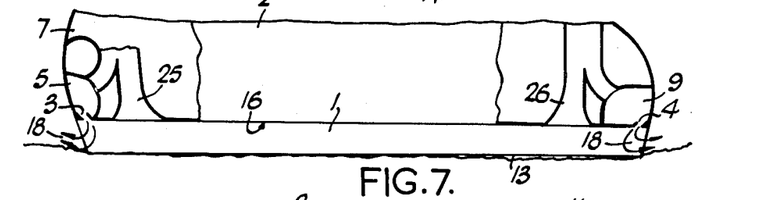
FIGURE 7 is a similar cross-section to that of FIGURE 6, the vehicle operating over smooth water.
Figure 8:
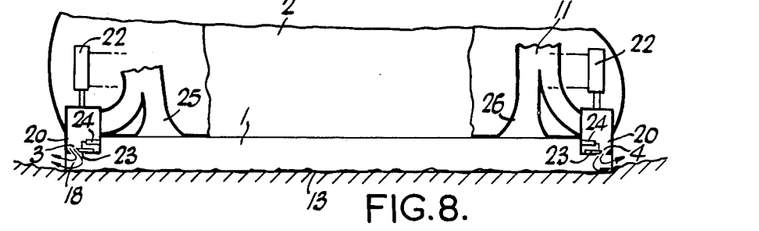
FIGURE 8 is a similar view to that of FIGURE 7 illustrating the application of an embodiment of the invention.
Figure 9:
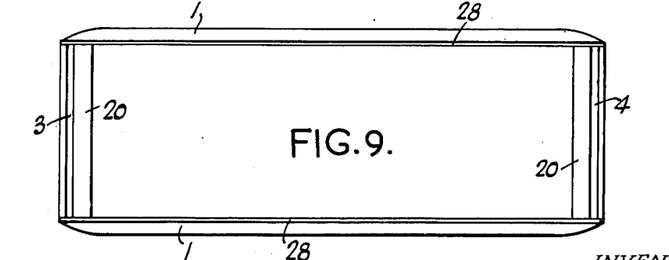
FIGURE 9 is an inverted plan view of the vehicle illustrated in FIGURE 8.

FIGURES 6 and 7 illustrate a vehicle of the type in which part of the side walls is immersed except over smooth water, supply ports being formed in the bottoms of the side walls through which issues air to form air curtains. The air is fed to the supply ports via the side-walls from the propellers 6 and 10 via ducts 25 and 26. In other respects the vehicle is generally of the form as illustrated in FIGURES 1 to 3. The vehicle in FIGURES 6 and 7 is so arranged that the strength of the fluid curtains 18 at the front and rear are such that they can contain the gaseous cushion for a height equivalent to the height of the side walls 1. Thus at all times the mean water level will be level with the bottom edges 13 of the side walls. When operating over waves, the water surface at the troughs 14 will be below the bottom edges of the side walls. The gap thus formed is filled by the air curtains formed from the supply ports in the bottoms of the side walls. In conditions of maximum wave height the vehicle will operate as in FIGURE 6. For the other extreme, over smooth water, the vehicle will operate as in FIGURE 7, with no air curtains being formed along the bottom edges of the side walls. Whilst some power is, of course, being saved over smooth water, by not forming the curtains below the side walls, further power can be saved by lowering the supply ports 3 and 4, as described above with respect to FIGURE 5, and reducing the mass flow of the curtain forming fluid. This is illustrated in FIGURES 8 and 9. The supply ports 3 and 4 can be lowered by lowering the structural members 20 when the wave height is less than maximum with a commensurate reduction in mass flow and saving in power. Similarly variations in height of the supply ports 3 and 4 and corresponding variations in mass flows can be carried out on vehicles in which the side walls are normally always clear of the water surface.

FIGURE 9 is an inverted plan view of the vehicle illustrated in FIGURE 8 from which it will be seen that the supply ports 28 in the bottoms of the side walls 1 co-operate at the ends of the side walls with the ends of the supply ports 3 and 4. The inverted plan view of the vehicle illustrated in FIGURES 6 and 7 will be very similar to that illustrated in FIGURE 9, as will also the inverted plan view of the vehicles illustrated in FIGURES 1 to 3 and FIGURES 4 and 5. In the latter two examples, the supply ports 28 are, of course, not provided.

Figures 10, 11, 12, 13:
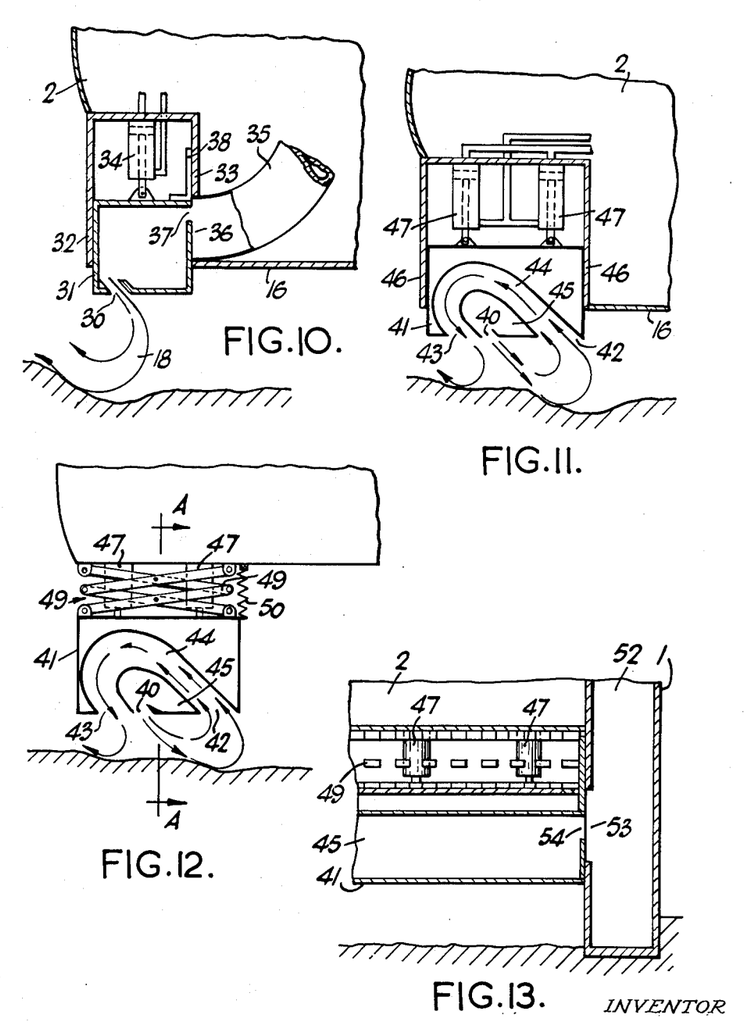
FIGURE 10 is a vertical cross-section through the lower part of one end of a vehicle, parallel to the fore and aft axis of the vehicle, illustrating one embodiment of the invention in more detail.
FIGURE 11 is a similar view to that of FIGURE 10 illustrating another embodiment.
FIGURE 12 is a similar view to that of FIGURE 10 illustrating a further embodiment.
FIGURE 13 is a cross-section on the line A—A of FIGURE 12 illustrating the co-operation of a movable structural member and a side wall.

The arrangement for varying the vertical height of the structural members 20, and thus the supply ports, can vary. FIGURES 10 to 13 illustrate various examples in which hollow structural members, in the bottom surfaces of which the supply ports are formed, are provided. FIGURE 10, which is a vertical cross section parallel to the fore and aft axis of a vehicle, illustrates an arrangement in which the supply port is formed in a member which is slidably attached to the main body of the vehicle, as in FIGURES 4 and 5 and 8 and 9. A supply port 30 is formed in the bottom of a movable member 31, in the form of a duct which can slide vertically within guides 32 and 33 attached to the main body of the vehicle. The duct is moved up and down by means of a series of hydraulic jacks or rams 34. Air is supplied via a supply duct 35 to a large port 36 formed in the inboard guide 33. A smaller port 37 is formed in the side of the movable member 31 co-operating with the large port 36. The port 37 maintains communication with the large port 36 at all positions of the movable member 31. A blanking member 38 is attached to the top of the movable member to blank off the top part of the large port 36 when the movable member 31 is in its lower position.

FIGURE 11 illustrates an arrangement for a curtain system in which at least part of the air issuing from the supply port is recovered and reused to form a further curtain. The supply port 40 is formed in the bottom of a movable member 41 in the form of a duct and a recovery port 42 is also formed in the bottom of the duct parallel to and spaced slightly inboard of the supply port. A further supply port 43 is also formed in the bottom of the member 41 immediately adjacent to and outboard of the supply port 40. A transfer duct 44 connects the recovery port 42 and the further supply port 43, and defines, with the bottom surface of the movable member, a supply duct 45. The movable member 41 is mounted in guides 46 attached to the vehicle body, and is moved up and down by hydraulic rams or jacks 47.

Instead of being mounted within slides the movable duct may be attached in other ways. FIGURE 12 illustrates a modification of FIGURE 11 in which the movable member 41 is attached by a linkage 49. The movable duct is moved up and down by the hydraulic rams 47, and a flexible member 50 is provided to seal the gap between the top of the movable duct and the main body of the vehicle.

In the examples illustrated in FIGURES 11 and 12, to provide a simple layout, the air is fed to the supply duct 45 from the ends. This is illustrated in FIGURE 13, which is a vertical cross-section, normal to the fore and aft axis of the vehicle, of the end of the movable member and an adjacent side wall as illustrated in FIGURE 10. Air is supplied to the ends of the supply ducts 45 by means of ducts 52 positioned in the side walls 1. A wide port 53 is provided in the inner skin of the side wall and a co-operating port 54 is provided in the end wall of the movable member 41. The operation is substantially the same as that illustrated in FIGURE 10, the two ports co-operating for the transfer of air. The arrangement of supplying air to the ends of the movable ducts, as illustrated in FIGURE 13, can also be used for the curtain system shown in FIGURE 10. Other forms of curtain systems may be provided, as, for example, where at least part of the curtain forming air is recovered and reused in the existing curtain. In such systems, the air is generally re-energised before re-issuing in the curtain, and the re-energising means, such as injectors or pumps, may be positioned either in the main body of the vehicle, or in the movable duct. The energising means for the simple curtain system illustrated in FIGURES 1 to 7 may also be positioned in the movable duct.

Figure 14:
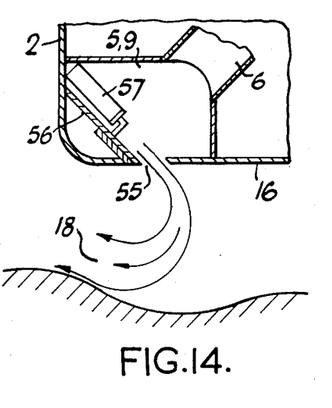
FIGURE 14 is a similar view to that of FIGURE 10 illustrating yet a further embodiment of the invention.
Figure 15:
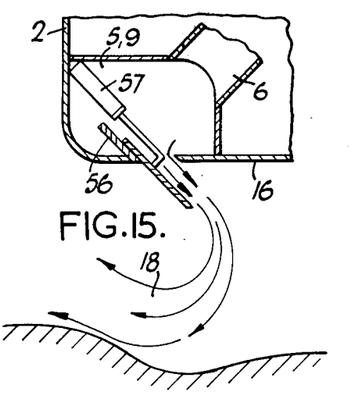
FIGURE 15 is a similar view to that of FIGURE 14 illustrating an alternative operating position of the embodiment illustrated in FIGURE 14.

Instead of forming the supply ports, and any other ports required for the formation of the air curtain in a moving structural member, the ports can be defined by one or more movable structural members. Thus an effect similar to that obtained by moving a structure which contains the ports, can be obtained by extending the wall or walls of the ports. In FIGURES 14 and 15 there is illustrated a part of the front of a vehicle having simple curtain systems formed from a supply port 55 the outer wall of which is formed by a plate-like member 56, shown in the retracted position in FIGURE 14 and in the extended position in FIGURE 15. The length of member 56 can be as necessary, depending upon the desired amount by which it is desired to extend the member 56. If it is desired to extend the member so as to reach the surface of the water, then the member will obviously be of such length as will enable this to be done. The member can be extended and retracted by a hydraulic jack 57.

Figure 16:
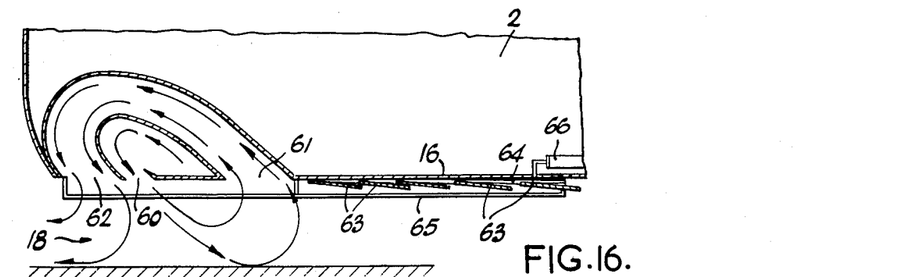
FIGURE 16 is a similar view to that of FIGURE 10 illustrating yet another embodiment of the invention.
Figure 17:
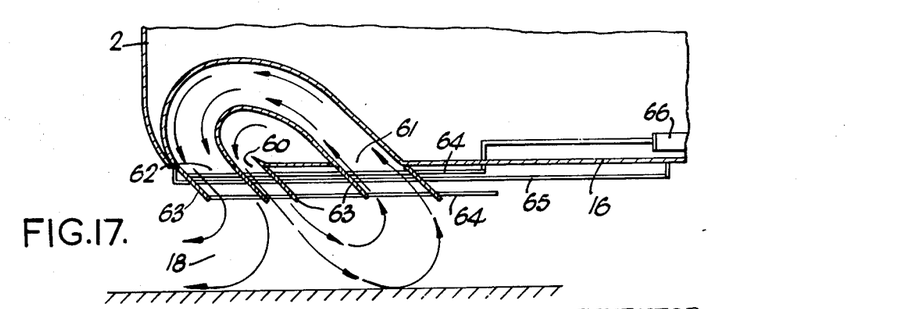
FIGURE 17 is a similar view to that of FIGURE 16 illustrating an alternative operating position of the embodiment illustrated in FIGURE 16.

FIGURES 16 and 17 illustrate a construction in which extensions are provided for both walls of all the ports in a recirculating curtain system such as is shown in FIGURES 11 and 12. Supply port 60, recovery port 61, and further supply port 62 are, in effect, extended downwardly by flat plates 63. The plates 63 are carried by rods 64, the whole assembly sliding on and being supported by suitable means such as rails 65. When not required, the plates 63 are pulled inwards by the rods 64, actuated by hydraulic jacks 66, and collapsed against the bottom surface of the vehicle as shown in FIGURE 16. The arrangement illustrated in FIGURES 16 and 17 only provides two predetermined positions of the ports.

The structural member, instead of being of a rigid form as described above can be of flexible form. An example of such a form is one in which the port or ports are defined by inflatable structures, constrained to form when inflated predetermined shapes, the shape being variable by variation of the inflation pressure. Such structures are described and illustrated in copending U.S. application Serial No. 285,999, filed June 6, 1963, and a typical example is illustrated in FIGURES 18 and 19 of the accompanying drawings, FIGURE 18 illustrating a vehicle embodying the example and FIGURE 19 illustrating the example in more detail.

Figure 18:
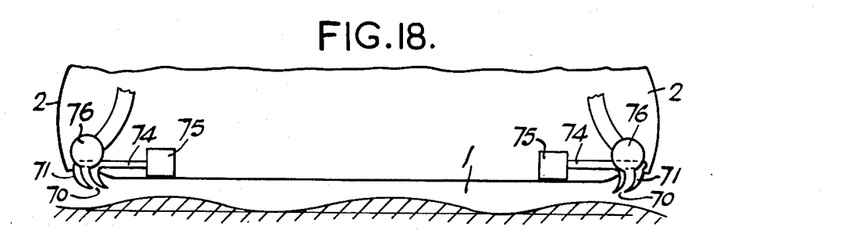
FIGURE 18 is a similar view to that of FIGURE 1 illustrating still another embodiment of the invention.
Figure 19:
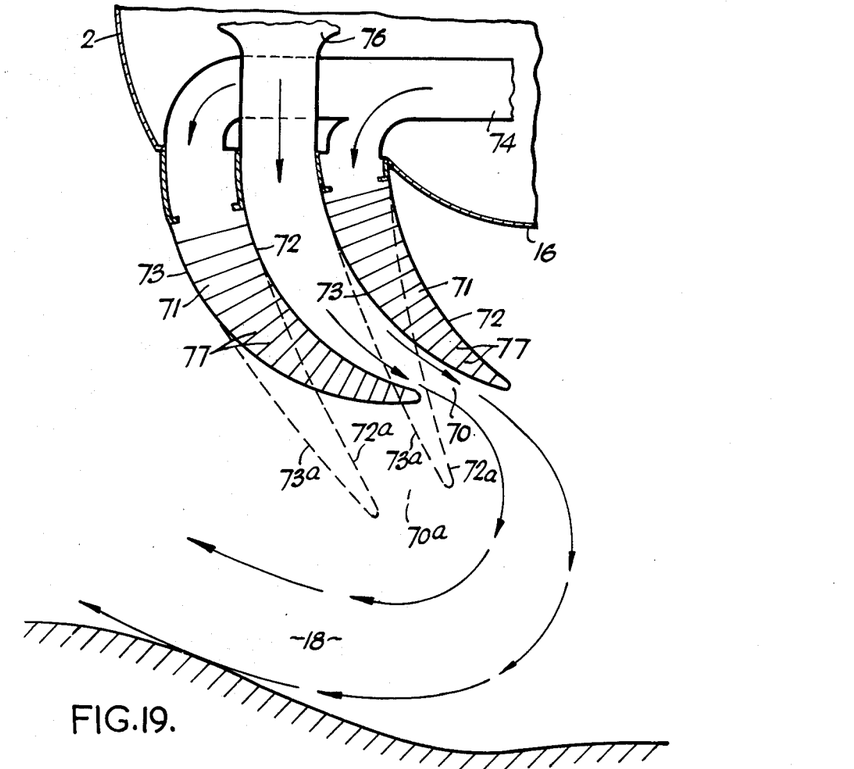
FIGURE 19 is a vertical cross-section through one end of the vehicle in FIGURE 18 illustrating the arrangement in greater detail.

The vehicle, as illustrated in FIGURE 18, is generally of the form illustrated in FIGURES 1 and 3, the supply ports 70 however, being formed by inflatable structural members 71. As will be seen more clearly in FIGURE 19, each structural member 71 has an inner wall 72 and an outer wall 73. Each member is inflated by means of air supplied via a pipe 74 from a compressor 75, whilst air to form the curtain is fed to the supply port 70 via a duct 76 which can be supplied from a propellor as in FIGURE 1. The distances between the walls 72 and 73 are stabilised by cords 77 which constrain the walls to a predetermined spaced apart relationship. By making the inner walls 72 of extensible material and the outer walls 73 of inextensible or less extensible material, the shape of each structural member 71 can be varied. For example, if the inflation pressure of the example illustrated in FIGURE 19 is increased, the members assume a shape as indicated by the dotted lines 72a, 73a, in which event the supply port moves downwards to the dotted line position 70a.

With such structural members it is not necessary to have the supply ports at a height which will clear all waves. The ports can be arranged to be at a mean height, as in FIGURE 18, and the structural members 71 will readily deflect upwards over waves which are higher than the clearance. The structural members can be so designed and shaped that they can be varied in shape to lower the supply ports down to the bottom edges of the side walls if so desired.

Vehicles may also be provided with means for subdividing the space occupied by the cushion to form separate cushions of gas, the relative pressures of which can be varied, to improve the stability of the vehicle. Where such sub-division is obtained by forming curtains of air from ports in the bottom of the vehicle, these ports have hitherto also required to be in a part of the structure which is at a height which will avoid any contact with the water.

Figure 20:
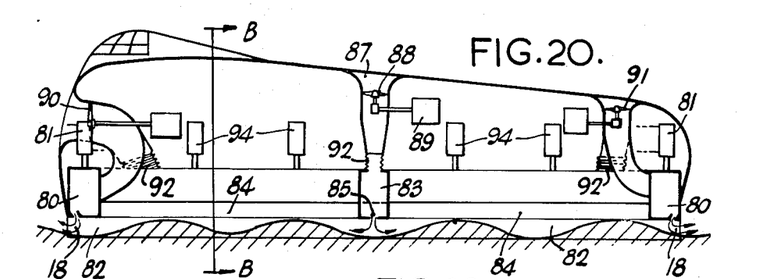
FIGURE 20 is a similar view to that of FIGURE 1 illustrating another embodiment of the invention.
Figure 21:
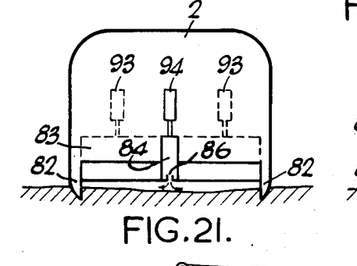
FIGURE 21 is a cross-section on the line B—B of FIGURE 20.
Figure 22:
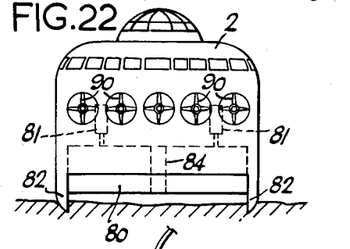
FIGURE 22 is a front view of the vehicle illustrated in FIGURE 20.

FIGURES 20, 21 and 22 illustrate a vehicle similar in general form to the previous examples described above, in which the cushion space beneath the vehicle is subdivided. In FIGURES 20, 21 and 22, movable structural members 80 are provided at the front and rear of the vehicle, operated by hydraulic jacks 81. These members 80 are similar to the members 20 in FIGURE 5 and operate in a similar manner. The side walls 82, in the present example, are shown as being of the type in which normally at least part of each wall is always immersed, i.e., no air curtains are formed from the bottom edges of the side walls.

Further movable structural members 83 and 84 are provided, one member 83 extending across the vehicle, normal to the fore and aft axis, at approximately the centre of the length of the vehicle, and the other 84 extending longitudinally, again approximately on the centre line. Supply ports 85 and 86 are formed in the bottoms of the members 83 and 84 respectively and air issues from these ports to form curtains which sub-divide the space bounded by the side walls and the front and rear air curtains, to form separate air cushions. The structural members 83 and 84 are in the form of hollow ducts through which air is fed to the supply ports 85 and 86. The member 83 is supplied with air by a propellor 87 situated in an intake 88 and driven by an engine 89. The member 84, in the present example, is divided into two parts to allow for the provision of the member 83. Air is supplied to the ports of member 84 by additional propellors at the front and rear of the vehicle. Thus, as seen in FIGURE 22, several propellors 90 are positioned across the front of the vehicle, the outermost supplying air to the front structural member 80, for example, the centre one supplying air to the front part of structural member 84 and the remaining two propellors supplying both the front member 80 and the member 84. Several propellors 91 can be provided at the rear of the vehicle to supply the rear structural member 80 and structural member 84 in a similar way. Flexible connections, as shown at 92, can be provided where necessary to allow for the movement of the structural members. The structural members 83 and 84 are moved by hydraulic jacks 93 and 94 respectively. The operation of the structural members 83 and 84 is similar to that of the structural members 80. Normally all the structural members are operated so as to maintain them all at the same vertical position i.e., so as to maintain all the supply ports at the same height, but it is possible to position the structural members to give different heights for the supply ports if so desired.

It is possible to provide more than one structural member extending across the length of the vehicle. The supply ports 85 and 86 can be provided with means to vary their width as illustrated for the supply ports 3 and 4 in FIGURES 5 and 8. Although the example illustrated in FIGURES 20, 21 and 22 and described above is of a vehicle in which no air curtains are formed from the bottom edges of the side walls, it will be appreciated that additional movable structures similar to 83 and 84 in FIGURES 20, 21 and 22 can readily be provided in vehicles in which air curtains are formed from the bottom edges of the side walls such as the vehicle illustrated in FIGURES 6 to 9.

Figure 23:
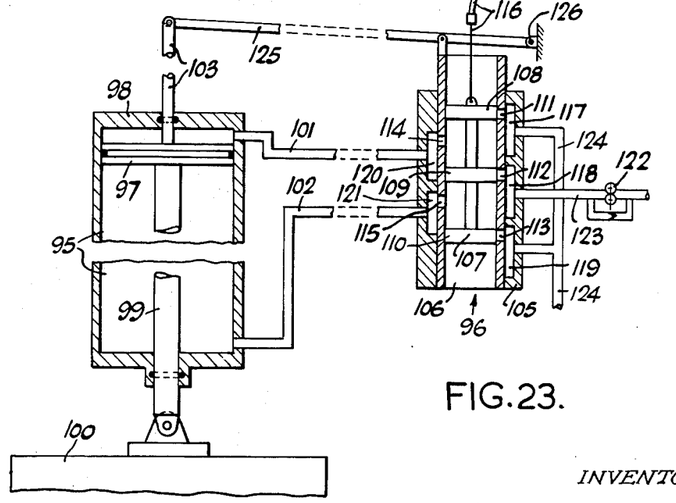
FIGURE 23 is a diagrammatic illustration of an hydraulic apparatus for moving the movable structural members.

FIGURE 23 illustrates one form of operating mechanism for moving the movable structural members up and down. A hydraulic jack 95 is controlled by a control valve 96. The hydraulic jack comprises a piston 97 moving in a closed cylinder 98. A connecting rod 99 connects the underside of the piston 97 with the top of the structural member 100. Oil under pressure is fed to the two ends of the cylinder 98 by means of pipes 101 and 102 from the control valve 96. When oil is admitted to the top of the cylinder via pipe 101 the piston 97 moves down, moving down also the structural member 100. Oil in the space beneath the piston escapes to exhaust via pipe 102. Supply of oil to the bottom of the cylinder via pipe 102 reverses the procedure. A connecting member 103 attached to top surface of the piston 97 provides a feed back to the control valve 96 as explained hereinafter.

The control valve comprises an open ended cylinder 105 within which slides a sleeve 106. Within the sleeve 106 there is a valve spool 107. The valve spool has three lands 108, 109 and 110 spaced apart, the lands corresponding and co-operating with three ports 111, 112 and 113 in the sleeve 106. Two further ports 114 and 115 are formed in the sleeve on the side opposite to the ports 111, 112 and 113 and are positioned between the lands 108 and 109, and 109 and 110, respectively. The valve spool 107 can be reciprocated by control means operated by the driver of the vehicle, for example by a flexible cable 116.

The ports 111, 112 and 113 in the sleeve 106 communicate with chambers 117, 118 and 119 respectively formed in the wall of the cylinder 105. Similarly the ports 114 and 115 communicate with chambers 120 and 121 respectively formed also in the wall of the cylinder. Oil under pressure is supplied from a pump 122 via a pipe 123 to the chamber 118, and chambers 117 and 119 are connected by a pipe 124 to exhaust. Chambers 120 and 121 are connected to the top and bottom respectively of the cylinder 98 of the hydraulic jack 95. A link 125 connects the member 103 attached to the piston 97 to the sleeve 106, the link pivoting about a fixed pivot 126.

The mechanism operates as follows. In FIGURE 23 the movable structural member 100 is in its uppermost position, the piston 97 being at the upper end of the cylinder 98. The valve spool 107 and the sleeve 106 are in the corresponding position, which is in their extreme upward position. When the driver desires to lower the member 100 the valve spool 107 is moved downward. This movement uncovers ports 111, 112 and 113, oil under pressure entering via chamber 118 and port 112 and flowing across through port 114, chamber 120 and pipe 101 to the top of the cylinder, the piston moving downwards, moving the member 100. Oil in the cylinder below the piston 97 escapes via pipe 102, chamber 121, port 115 across to port 113, chamber 119 and thence to exhaust via 124. As the piston moves down member 103 and link 125 move the sleeve downwards eventually causing the ports 111, 112 and 113 to coincide with the lands 108, 109 and 110, shutting off the flow of oil and stopping movement of the piston 97. Thus the driver selects the extent by which the member 100 is to move and the valve and hydraulic jack co-act to produce this movement.

A further use of the invention is to enable a vehicle which is normally operable only over water, to attain the ability to transfer to a surface on land. Vehicles having side walls are normally only intended to operate over water, and when being loaded or unloaded they are moored alongside a jetty or pier or some similar construction. Such facilities are expensive to provide and maintain, and often less convenient than a similar facility on land. Further, when it is necessary to service or overhaul the vehicles, either dry docking facilities are required or slipways with special supporting and conveying apparatus. The ability to be able to transfer readily from water to land and vice-versa would enable vehicles to take advantage of cheaper and more convenient facilities on land and provide easier and quicker servicing and overhauls.

For vehicles as illustrated in FIGURES 4 and 5 the ability to transfer can be obtained by moving the movable structural members 20 down until the bottoms of the members are at approximately the same level as the bottoms of the side walls. For a given mass flow of air through the supply ports 3 and 4 in the bottoms of the structural members to form curtains, there is a correlation between the cushion pressure sustained and the height of the curtains. The less the vertical height the higher the cushion pressure. By moving the structural members, and thus the ports, down, the curtains have only a small height and the cushion pressure thus rises. As a result the vehicle lifts until the bottom edges of the side walls just emerge from the water. Air will then start to escape beneath the side walls. Depending upon the mass flow of the air from the supply ports 3 and 4, so the vehicle will reach a final position in which the mass flow of curtain forming air is sufficient to seal the gap between the bottoms of the structural members 20 and the surface and also provide for sufficient air to escape beneath the side walls to maintain these clear of the surface. The vehicle in this condition can transfer from a water surface to a land surface.

The air escaping beneath the side walls has to come from the curtain forming mass flow in the example just described. An alternative, and possibly more convenient, method is to take advantage of the ability to vary the mass flow of the curtain forming air as illustrated in FIGURE 5. To transfer from water to land, the structural members 20 are again moved down until the bottoms of the members are approximately level with the bottom of the side walls. The mass flow of the curtain forming air is reduced by the sliding flaps 23 to a value which will maintain the normal cushion pressure at the reduced height, and excess air available can be pumped directly to the cushion. Further, the flow of curtain forming air can be completely shut off, the air then only being fed directly to the cushion as in a plenum chamber form of vehicle. The cushion pressure tends to increase which lifts the vehicle until the bottom edges of the side walls emerge from the water, when air escapes beneath the side walls. The vehicle can then transfer from the water to the land. In FIGURE 5 the transfer of excess air, or the feeding of the air when the curtains are shut off, can be carried out by providing ducts 130 supplying ports 131 in the bottom surface of the vehicle. The ports 131 are normally closed by sliding flaps 132 which are operated by hydraulic jacks 133. These hydraulic jacks can be similar to that illustrated in FIGURE 23 and described above, and operate in the same manner.

Where additional curtains are formed for sub-dividing the cushion space, as illustrated in FIGURES 20, 21 and 22, then instead of providing additional means for pumping air directly into the cushion, this air can be pumped in through the supply ports from which issues the air normally forming the additional curtains. With a vehicle having such additional curtains, there is no need to transfer excess air. With the vehicle illustrated in FIGURES 20, 21 and 22, if the structural members are moved down to a position where the bottoms of the members are three-quarters of the way down the side walls, then the air curtains formed from the supply ports in the bottoms of the members are of a strength which is capable of containing the normal cushion pressure at a clearance which will result in the bottom edges of the side-walls being just clear of the water surface if it is smooth. The air escaping from the cushion beneath the side-walls will be replaced by the air forming the additional curtains dividing the cushion space. Thus it will be seen that with the movable members at this position the vehicle can just be able to transfer from water to land. An increased clearance can be obtained beneath the side walls by moving the structural members slightly further down.

In effect, under the conditions described above, the vehicle can operate in varying forms as a "plenum chamber" vehicle with no air curtains; partly as a "plenum chamber" vehicle, i.e.., along the sides, and partly as an "air curtain" vehicle, i.e., at the front and rear. Once over land the vehicle can be moved to the desired position. When the air flow is shut off the vehicle can either stand on its side walls if they are designed for this, or on suitable supports.

I claim:
1. A vehicle for travelling over water having a main body which in operation is at least partly supported above the surface of the water by at least one cushion of pressurised gas formed and contained beneath said body, comprising side walls extending substantially parallel to the fore-and-aft axis of the vehicle and depending from the bottom surface of said main body, said side walls forming part of the lateral boundary of said cushion, means for closing the gaps between the ends of said side walls and forming the remainder of the lateral boundary of said cushion including a vertically movable structural member at one end of the vehicle forming the upper part of the cushion boundary between the ends of said side walls, and means for causing a fluid curtain to issue from the lower portion of said structural member and to form the lower part of said cushion boundary below said member, and means for adjusting the position of said structural member vertically with respect to said main body and said side walls so as to normally maintain the bottom of said member at a distance above the bottoms of said side walls which is approximately equal to the height of the waves over which the vehicle is travelling, whereby, when the bottoms of said side walls are just immersed beneath the surface of the trough of a wave, said structural member is just clear of the crest of said wave.

2. A vehicle as claimed in claim 1 wherein the movable structural member comprises a duct having a port formed in the bottom thereof from which issues the fluid forming the fluid curtain.

3. A vehicle as claimed in claim 1 wherein the movable structural member comprises a plate-like member slidably mounted in the main body of the vehicle and defining the edge of a supply port from which issues the fluid forming the fluid curtain.

4. A vehicle as claimed in claim 1 including means for supplying gas directly to the cushion.

5. A vehicle as claimed in claim 1 including means for varying the mass flow of the fluid forming the fluid curtain.

6. A vehicle as claimed in claim 5 including a supply port from which issues the fluid forming the fluid curtain, and wherein the means for varying the mass flow of said fluid comprises means for varying the width of said supply port.

7. A vehicle as claimed in claim 5 wherein the fluid forming the curtain is a gas, and which includes means for transferring part of the gas normally forming the curtain and supplying it directly to the cushion when the mass flow of the gas forming the curtain is reduced.

8. A vehicle for travelling over water having a main body which in operation is at least partly supported above the surface of the water by at least one cushion of pressurised gas formed and contained beneath said body, comprising side walls extending substantially parallel to the fore-and-aft axis of the vehicle and depending from the bottom surface of said main body, said side walls forming part of the lateral boundary of said cushion, means for closing the gaps between the ends of said side walls and forming the remainder of the lateral boundary of said cushion including a vertically movable structural member at each end of the vehicle forming the upper part of the cushion boundary between the ends of said side walls and having a port formed in the bottom thereof, means for causing fluid curtains to issue from said ports and to flow downwardly therefrom so as to form the lower parts of said cushion boundary below said structural members, and means under the control of the operator of the vehicle for adjusting the positions of said structural members vertically with respect to said main body and said side walls so as to normally maintain the bottoms of said members at a distance above the bottoms of said side walls which is approximately equal to the height of the waves over which the vehicle is travelling, whereby, when the bottoms of said side walls are just immersed beneath the surface of a trough of a wave, said structural members are just clear of the crest of said wave.

9. A vehicle as claimed in claim 8 wherein each of said movable structural members comprises a duct which is slidably mounted in the main body of the vehicle.

10. A vehicle as claimed in claim 9 including means carried by said movable ducts for varying the mass flow of the fluid issuing from said ports.

11. A vehicle as claimed in claim 10 wherein the fluid forming the curtains is a gas, and which includes means for supplying gas directly to the cushion when the mass flow of the gas forming the curtains is reduced.

References Cited by the Examiner
UNITED STATES PATENTS

| | | | |
|---|---|---|---|
| 2,838,257 | 6/58 | Wibault | 180—7 |
| 3,040,688 | 6/62 | Gram | 180—7 |
| 3,045,951 | 7/62 | Freeland | 180—7 |
| 3,066,753 | 12/62 | Hurley et al. | 180—7 |
| 3,088,536 | 5/63 | Chezem | 180—7 |

FOREIGN PATENTS

| | | |
|---|---|---|
| 232,436 | 2/61 | Australia. |
| 854,211 | 11/60 | Great Britain. |
| 1,238,499 | 7/60 | France. |

OTHER REFERENCES

"Symposium on Ground Effect Phenomena"; Princeton University, Oct. 21–23, 1959, p. 240, FIG. 2.

MILTON BUCHLER, *Primary Examiner.*

PHILIP ARNOLD, A. HARRY LEVY, *Examiners.*